(12) United States Patent
Kyle et al.

(10) Patent No.: US 10,065,407 B2
(45) Date of Patent: Sep. 4, 2018

(54) SYSTEMS AND METHODS FOR SEPARATION OF THERMAL INTERFACE BOND

(71) Applicant: Dell Products L.P., Round Rock, TX (US)

(72) Inventors: Lawrence A. Kyle, Salado, TX (US); Corey Dean Hartman, Hutto, TX (US); Hsu-Chu Wang, Taipei (TW)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 15/284,955

(22) Filed: Oct. 4, 2016

(65) Prior Publication Data

US 2018/0093465 A1  Apr. 5, 2018

(51) Int. Cl.
  *B32B 38/10* (2006.01)
  *B32B 43/00* (2006.01)
  *G06F 1/20* (2006.01)
  *G06F 1/18* (2006.01)

(52) U.S. Cl.
  CPC ............ *B32B 43/006* (2013.01); *G06F 1/183* (2013.01); *G06F 1/20* (2013.01); *B32B 38/10* (2013.01); *Y10T 156/11* (2015.01); *Y10T 156/1168* (2015.01); *Y10T 156/19* (2015.01); *Y10T 156/1961* (2015.01); *Y10T 156/1978* (2015.01)

(58) Field of Classification Search
  CPC ..... B32B 38/10; B32B 43/006; Y10T 156/11; Y10T 156/1168; Y10T 156/19; Y10T 156/1961; Y10T 156/1978; G06F 1/183; G06F 1/20
  USPC ................ 156/701, 714, 716, 750, 761, 764
  See application file for complete search history.

(56) References Cited

U.S. PATENT DOCUMENTS

| | | | |
|---|---|---|---|
| 2005/0024823 A1* | 2/2005 | Jo | G06F 1/20 361/679.48 |
| 2007/0122763 A1* | 5/2007 | Farzin-Nia | A61C 7/02 433/4 |
| 2011/0273831 A1* | 11/2011 | Kyle | H01R 12/7076 361/679.31 |
| 2013/0077261 A1* | 3/2013 | He | G06F 1/183 361/737 |

* cited by examiner

*Primary Examiner* — Mark A Osele
*Assistant Examiner* — Nickolas Harm
(74) *Attorney, Agent, or Firm* — Jackson Walker L.L.P.

(57) ABSTRACT

In accordance with these and embodiments of the present disclosure, an information handling system may include a circuit board, an information handling resource electrically coupled to the circuit board, and a mechanical mechanism configured to receive a user interaction at a mechanical mechanism, and, in response to the user interaction, separate a mechanical bond between the information handling resource and a component by applying a controlled force of the mechanical mechanism to the information handling resource at a controlled location of the information handling resource.

14 Claims, 5 Drawing Sheets

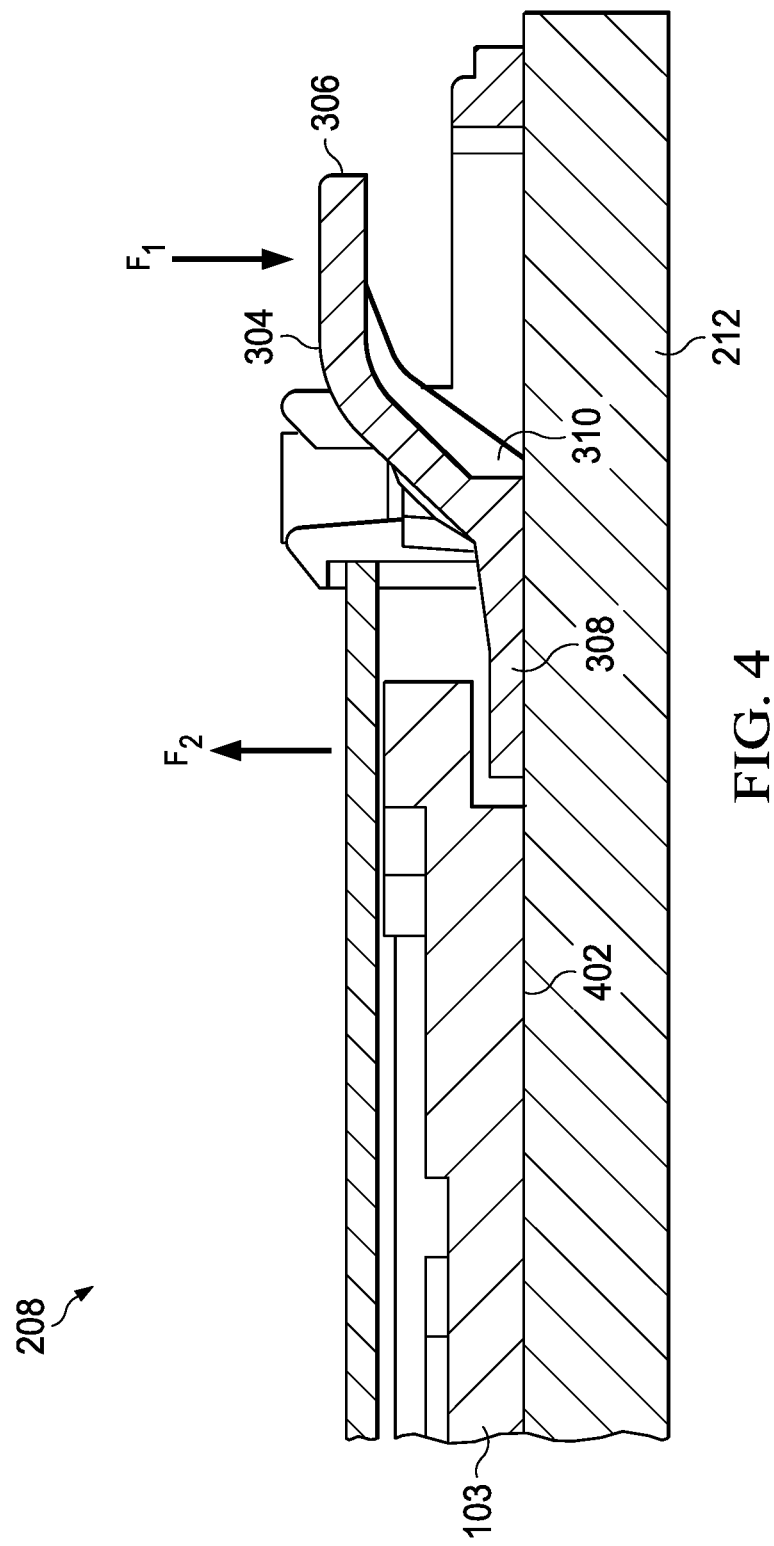

SYSTEMS AND METHODS FOR SEPARATION OF THERMAL INTERFACE BOND

TECHNICAL FIELD

The present disclosure relates to modular information handling systems. More specifically, embodiments of the disclosure provide systems and methods for separation of a thermal interface bond, for example a thermal interface bond between a processor and a heat dissipater.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, to control temperature of components of an information handling system, heat-generating components are often thermally coupled to heatsinks such that air may be directed over the heatsinks to dissipate such heat, and minimize component temperatures.

Historically, processors have been clamped into processor sockets via independent loading mechanisms. In such arrangements, a heatsink with thermal interface material applied is mounted to an integrated heat spreader of a processor via a spring-loaded attachment to the independent loading mechanism. Such spring loading serves to clamp the thermal interface material between the heatsink and the processor's heat spreader. Over time, a mechanical bond is created via the thermal interface material. Accordingly, if the processor needs to be mechanically decoupled to the heatsink, the spring-loading clamping load is removed and an individual may twist the heat sink relative to the processor to remove it.

However, new industry standards may provide that processors are retained by mechanisms other than independent loading mechanisms. Instead, a processor may be coupled to a heatsink (with thermal interface material applied) via an interface bracket, which may also be referred to as a processor clip. To break the thermal interface bond in this arrangement, a processor must be pried off without twisting (e.g., by a force perpendicular to a surface of the processor heat spreader), due to mechanical constraints of the interface bracket. Such a removal process, if performed manually by a user, may leave the processor susceptible to damage.

SUMMARY

In accordance with the teachings of the present disclosure, the disadvantages and problems associated with separation of a thermal interface bond between a heat dissipater and an information handling resource may be reduced or eliminated.

In accordance with embodiments of the present disclosure, a method may include receiving a user interaction at a mechanical mechanism and, in response to the user interaction, separating a mechanical bond between a first component and a second component by applying a controlled force of the mechanical mechanism to the first component at a controlled location of the first component.

In accordance with these and other embodiments of the present disclosure, a system may comprise a mechanical mechanism configured to receive a user interaction at a mechanical mechanism and, in response to the user interaction, separate a mechanical bond between a first component and a second component by applying a controlled force of the mechanical mechanism to the first component at a controlled location of the first component.

In accordance with these and other embodiments of the present disclosure, an information handling system may include a circuit board, an information handling resource electrically coupled to the circuit board, and a mechanical mechanism configured to receive a user interaction at a mechanical mechanism, and, in response to the user interaction, separate a mechanical bond between the information handling resource and a component by applying a controlled force of the mechanical mechanism to the information handling resource at a controlled location of the information handling resource.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 4 illustrates a side elevation view of an example processor/heat dissipater module, in accordance with embodiments of the present disclosure.

DETAILED DESCRIPTION

Preferred embodiments and their advantages are best understood by reference to FIGS. 1-4, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

For the purposes of this disclosure, circuit boards may broadly refer to printed circuit boards (PCBs), printed wiring boards (PWBs), printed wiring assemblies (PWAs) etched wiring boards, and/or any other board or similar physical structure operable to mechanically support and electrically couple electronic components (e.g., packaged integrated circuits, slot connectors, etc.). A circuit board may comprise a substrate of a plurality of conductive layers separated and supported by layers of insulating material laminated together, with conductive traces disposed on and/or in any of such conductive layers, with vias for coupling conductive traces of different layers together, and with pads for coupling electronic components (e.g., packaged integrated circuits, slot connectors, etc.) to conductive traces of the circuit board.

Figure 1:
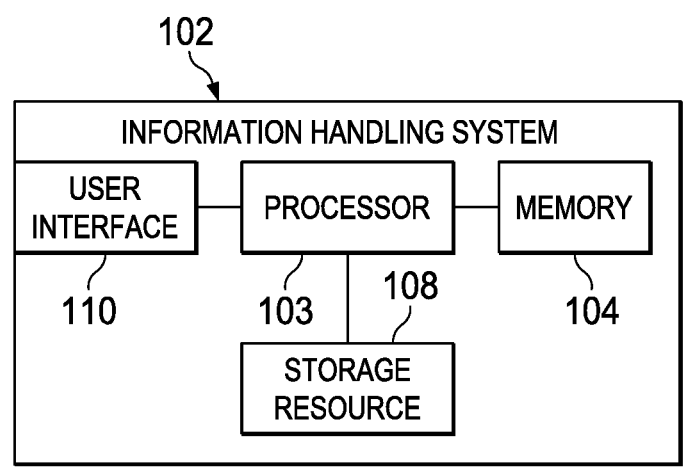
FIG. 1 illustrates a block diagram of selected components of an example information handling system, in accordance with embodiments of the present disclosure.

FIG. 1 illustrates a functional block diagram of selected components of an example information handling system 102, in accordance with embodiments of the present disclosure. In some embodiments, information handling system 102 may be a personal computer (e.g., a desktop computer or a portable computer). In other embodiments, information handling system 102 may comprise a storage server for archiving data.

As depicted in FIG. 1, information handling system 102 may include a processor 103, a memory 104 communicatively coupled to processor 103, a storage resource 108 communicatively coupled to processor 103, and a user interface 110 communicatively coupled to processor 103.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 108, and/or another component of information handling system 102.

Memory 104 may be communicatively coupled to processor 103 and may include any system, device, or apparatus configured to retain program instructions and/or data for a period of time (e.g., computer-readable media). Memory 104 may include random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to its associated information handling system 102 is turned off.

Storage resource 108 may include any system, device, or apparatus configured to store data. Storage resource 108 may include one or more hard disk drives, magnetic tape libraries, optical disk drives, magneto-optical disk drives, solid state storage drives, compact disk drives, compact disk arrays, disk array controllers, and/or any other systems, apparatuses or devices configured to store data. In certain embodiments, storage resource 108 may include one or more storage enclosures configured to hold and/or power one or more of such devices. In the embodiments represented by FIG. 1, storage resource 108 may reside within information handling system 102. However, in other embodiments, storage resource 108 may reside external to information handling system 102 (e.g., may be coupled to information handling system 102 via a network).

User interface 110 may comprise any instrumentality or aggregation of instrumentalities by which a user may interact with information handling system 102. For example, user interface 110 may permit a user to input data and/or instructions into information handling system 102, and/or otherwise manipulate information handling system 102 and its associated components. User interface 110 may also permit information handling system 102 to communicate data to a user, e.g., by way of a display device.

In addition to processor 103, memory 104, storage resource 108, and user interface 110, information handling system 102 may include one or more other information handling resources. Such an information handling resource may include any component system, device or apparatus of an information handling system, including without limitation, a processor, bus, memory, I/O device and/or interface, storage resource (e.g., hard disk drives), network interface, electro-mechanical device (e.g., fan), display, power supply, and/or any portion thereof. An information handling resource may comprise any suitable package or form factor, including without limitation an integrated circuit package or a printed circuit board having mounted thereon one or more integrated circuits.

Figure 2:
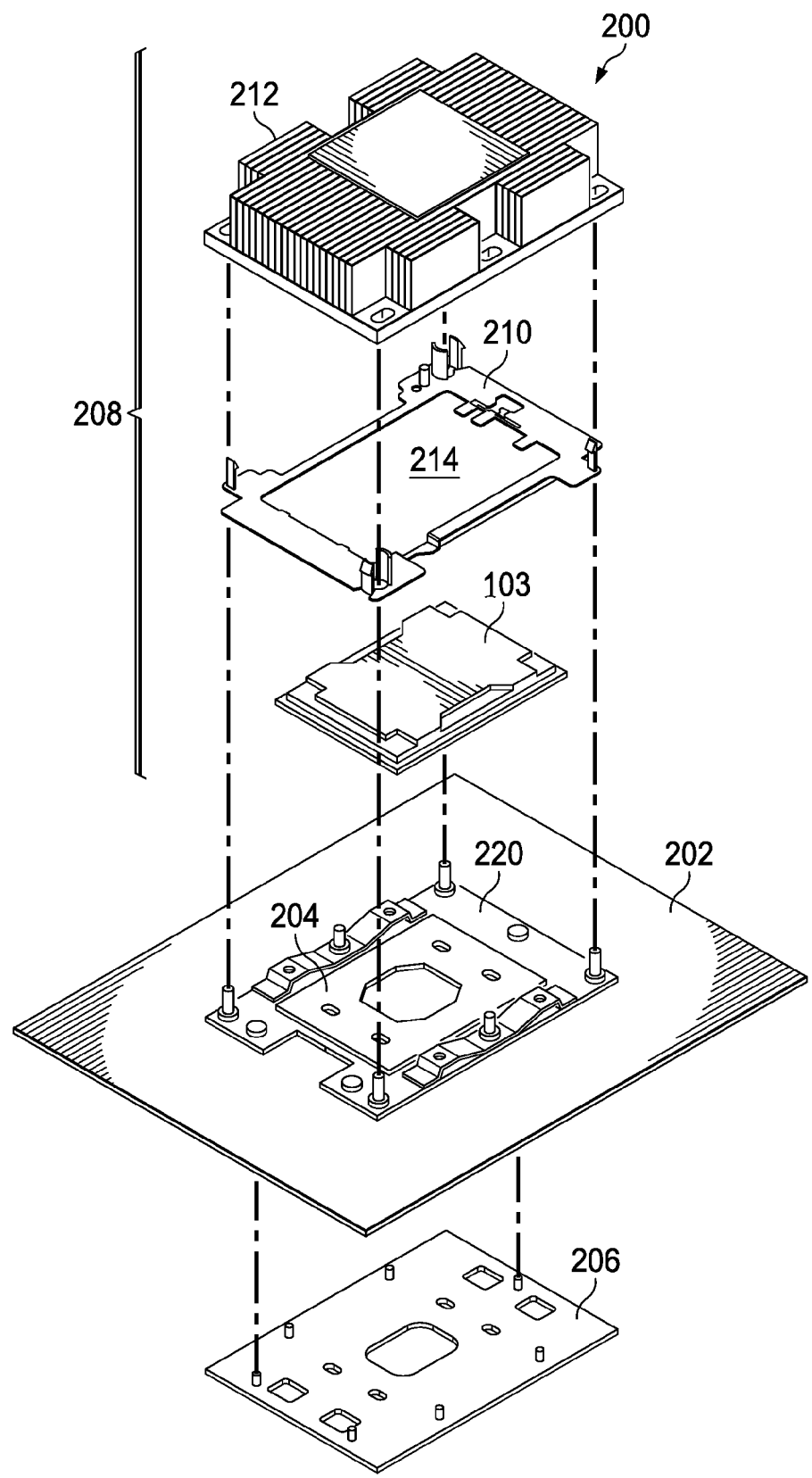
FIG. 2 illustrates an exploded perspective view of the various components of an example processor loading system, in accordance with embodiments of the present disclosure.

FIG. 2 illustrates an exploded perspective view of the various components of an example processor loading system 200, in accordance with embodiments of the present disclosure. In some embodiments of the present disclosure, the processor loading system 200 may be housed in a chassis or other housing for housing components of information handling system 102 described above with reference to FIG. 1. As shown in FIG. 2, processor loading system 200 may comprise a circuit board 202 having a socket 204 mounted thereon. In some embodiments, socket 204 may be electrically coupled to information handling resources, including one or more of memory 104, storage resource 108, and user interface 110, via conductive traces formed in circuit board 202. A plurality of pins may be located on socket 204 for such electrical coupling.

Processor loading system 200 may also include a mechanical top plate 220 which includes one or more features for mechanically fastening mechanical top plate 220 to a backing plate 206 on the opposite side of circuit board 202 from mechanical top plate 220. As shown in FIG. 2, backing plate 206 may comprise a substantially planar plate of any suitable material and may have one or more features for mechanically fastening mechanical top plate 220 and/or heat dissipater 212 to backing plate 206.

Processor loading system 200 may also include a processor/heat dissipater module 208. As shown in FIG. 2, processor/heat dissipater module 208 may comprise heat dissipater 212, interface bracket 210, and processor 103. Heat dissipater 212 may comprise a heatsink or other heat dissipation device. Heat dissipater 212 may include a surface that may thermally couple to processor 103 directly or through a thermal interface material. Heat dissipater 212 may also include one or more features for mechanically fastening heat dissipater 212 to mechanical top plate 220, thus creating mechanical loading for thermally coupling heat dissipater 212 to processor 103 and for creating mechanical loading for electrically coupling processor 103 to socket 204.

Interface bracket 210 (which may also be known as a processor clip) may include any system, device, or apparatus for mechanically and thermally coupling heat dissipater 212 to processor 103. Accordingly, interface bracket 210 may include one or more mechanical features sized and shaped to mechanically engage with processor 103 such that processor 103 may snap to or otherwise mechanically couple to interface bracket 210, such that processor 103 may thermally couple to heat dissipater 212 via opening 214 of interface bracket 210.

Figure 3A:
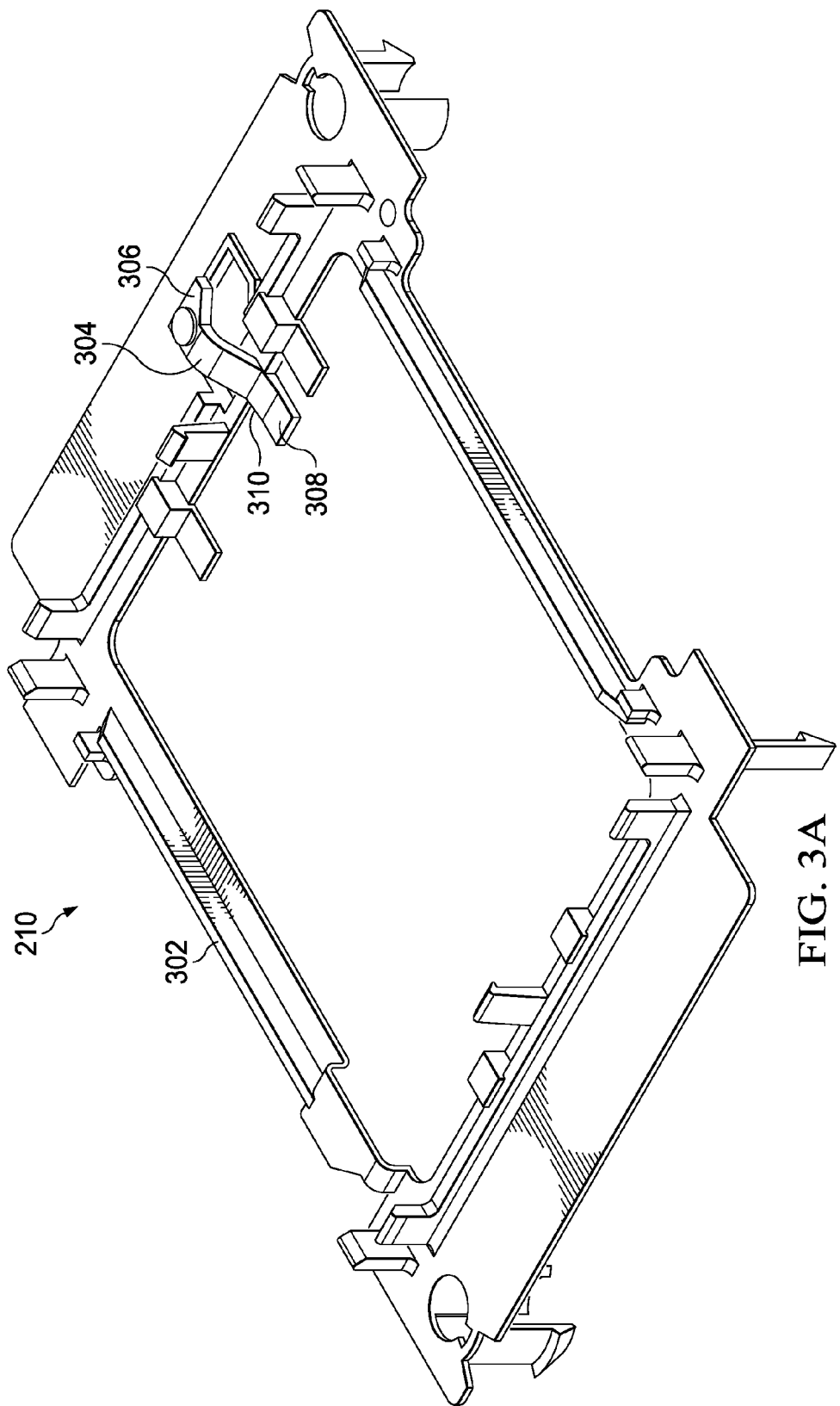
FIGS. 3A and 3B illustrate perspective views of different sides of an example interface bracket, in accordance with embodiments of the present disclosure.
Figure 3B:
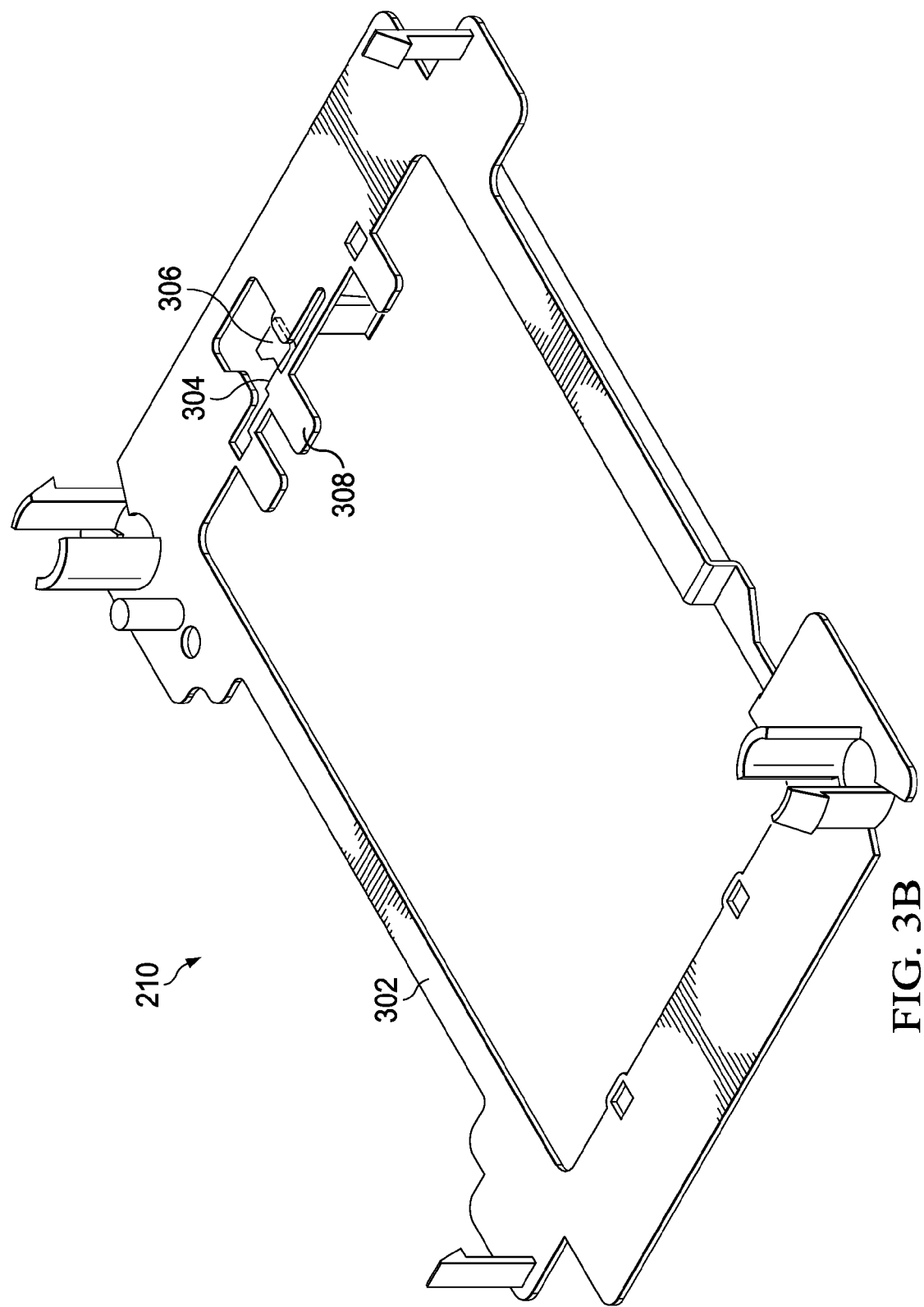

FIGS. 3A and 3B illustrate perspective views of different sides of an example interface bracket 210, in accordance with embodiments of the present disclosure. As shown in FIGS. 3A and 3B, interface bracket 210 may include a body 302 having a lever 304 pivotally coupled to body 302 via a fulcrum axis 310. Also as depicted in FIGS. 3A and 3B, lever 304 may include an effort arm 306 on one end of lever 304, and a load arm 308 on the opposite end of lever 304 such that fulcrum axis 310 is between effort arm 306 and load arm 308. Accordingly, when a force is applied to effort arm 306, lever 304 may rotate about fulcrum axis 310 relative to body 302, causing a corresponding force to be applied by load arm 308 to processor 103 (when engaged with interface bracket 210), as described in greater detail below.

FIG. 4 illustrates a side elevation view of an example processor/heat dissipater module 208, in accordance with embodiments of the present disclosure. As shown in FIG. 4, a force $F_1$ may be applied to effort arm 306 (e.g., in a downward direction with respect to FIG. 4) by a person using a finger or a suitable tool. Such force $F_1$ may cause lever 304 to rotate about fulcrum axis 310 thus causing load arm 308 to apply a corresponding force $F_2$ (e.g., in an upward direction with respect to FIG. 4). When a force $F_1$ is applied to effort arm 306 such that force $F_2$ overcomes an adhesive force of a thermal interface bond which bonds processor 103 to heat dissipater 212 at thermal interface 402, processor 103 may separate from heat dissipater 212. Characteristics of lever 304 (e.g., flexibility, rigidity, tensile strength, etc.) may be such that force $F_2$ is controlled to a maximum amount, so as to prevent damage to processor 103 in the case that a person applies an excessive amount of force $F_1$. Accordingly, lever 304 facilitates the application of a controlled force $F_2$ to a controlled location on the surface of processor 103 in order to separate the thermal interface bond.

Although the foregoing contemplates separation of a thermal interface bond between a processor 103 and a heat dissipater 212, it is understood that the systems and methods disclosed herein may be applied to separate any mechanical or adhesive bond between two components.

In addition, although the foregoing contemplates separation of a thermal interface bond between a processor 103 and a heat dissipater 212 using a lever 304, it is understood that a lever 304 is one of many possible ways to perform such separation, and that this disclosure contemplates any separation mechanism (e.g., lever, set screw, etc.) whereby a mechanical mechanism separates two components by application of a controlled force at a controlled location of one of the components in response to a user interaction with the mechanical mechanism.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:
1. A method comprising:
   receiving a user interaction at a mechanical mechanism that includes an interface bracket configured to mechanically couple a first component and a second component, the interface bracket including a body and a lever coupled to the body, the lever including an effort arm and a load arm, wherein the user interaction includes application of a force to the effort arm; and in response to the user interaction, separating a mechanical bond between the first component and the second component by applying a controlled force of the mechanical mechanism to the first component at a controlled location of the first component, wherein the controlled force is applied by the load arm.

2. The method of claim 1, wherein the mechanical bond comprises an adhesive bond between the first component and the second component.

3. The method of claim 1, wherein the mechanical bond comprises a bond of thermal interface material between the first component and the second component.

4. The method of claim 1, wherein the second component comprises a heat dissipater.

5. The method of claim 1, wherein the first component comprises a processor.

6. A system comprising:

an interface bracket configured to mechanically couple a first component and a second component, the interface bracket including a body and a lever coupled to the body;

wherein the lever includes an effort arm and a load arm, and wherein the lever is configured to:

receive a user interaction, wherein the user interaction includes application of a force to the effort arm; and in response to the user interaction, separate a mechanical bond between the first component and the second component by applying a controlled force to the first component at a controlled location of the first component, wherein the controlled force is applied by the load arm.

7. The system of claim 6, wherein the mechanical bond comprises an adhesive bond between the first component and the second component.

8. The system of claim 6, wherein the mechanical bond comprises a bond of thermal interface material between the first component and the second component.

9. The system of claim 6, wherein the second component comprises a heat dissipater.

10. The system of claim 6, wherein the first component comprises a processor.

11. An information handling system comprising:

a circuit board;

an information handling resource electrically coupled to the circuit board; and a loading system for providing loading to electrically couple the information handling resource to the circuit board, the loading system including an interface bracket configured to mechanically couple the information handling resource and a component, the interface bracket comprising a body and a lever mechanically coupled to the body, the lever including an effort arm and a load arm;

wherein the interface bracket is configured to:

receive a user interaction including application of a force to the effort arm; and in response to the user interaction, separate a mechanical bond between the information handling resource and the component by the load arm applying a controlled force to the information handling resource at a controlled location of the information handling resource.

12. The information handling system of claim 11, wherein the mechanical bond comprises an adhesive bond between the information handling resource and the component.

13. The information handling system of claim 11, wherein the mechanical bond comprises a bond of thermal interface material between the information handling resource and the component.

14. The information handling system of claim 11, wherein the component comprises a heat dissipater.

* * * * *